United States Patent

[11] 3,629,080

| [72] | Inventor | Norman Louis Weinberg<br>Stamford, Conn. |
| [21] | Appl. No. | 865,951 |
| [22] | Filed | Oct. 13, 1969 |
| [45] | Patented | Dec. 21, 1971 |
| [73] | Assignee | American Cyanamid Company<br>Stamford, Conn. |

[54] ELECTROCHEMICAL MERCURATION OR ORGANIC COMPOUNDS
14 Claims, No Drawings

[52] U.S. Cl........................................................ 204/72,
207/23, 207/78
[51] Int. Cl........................................................ C07b 29/08

[50] Field of Search............................................ 204/72, 73, 78, 59

[56] References Cited
UNITED STATES PATENTS
3,534,078  10/1970  Woodhall et al..............  204/59 R

*Primary Examiner*—John H. Mack
*Assistant Examiner*—R. L. Andrews
*Attorney*—Charles J. Fickey

ABSTRACT: Electrosynthesis of compounds from olefins having useful functions such as hydroxy, amido, alkoxy, etc., and containing the readily replaceable organo-mercury function. Aromatics react also to give organomercurials.

ELECTROCHEMICAL MERCURATION OR ORGANIC COMPOUNDS

This invention relates to the formation of expensive and synthetically useful mercuric salts anodically from mercury. The reaction products of olefinic or aromatic compounds and these mercuric salts may be further treated in a cathodic reaction, regenerating mercury and a usefully functionalized organic product.

It is well known that mercuric salts react with a variety of unsaturated organic compounds (such as olefins, aromatics, and even cyclopropanes) to form organomercurials (See W. Kitching, *Organometallic Reviews*, 3, 35, 35–133 (1968). It is also known that these organomercurials may be treated in further reactions to give useful demercurated products.

It is an object of the present invention to obtain organomercuric compounds readily by electrosynthesis.

A further object is to provide a method for obtaining substituted derivatives of organic compounds having a double bond.

These and other objects of the invention will become apparent as the description thereof proceeds.

The present invention describes the electrochemical preparation of mercuric salts in both aqueous and nonaqueous media via anodic dissolution of the mercury anode in the presence of an unsaturated organic reactant.

If a mercury electrode is made the anode in an electrolysis cell, Hg is oxidized to mercurous ($Hg_2^{2+}$) and mercuric ($Hg^{2+}$) ions which exist in equilibrium with each other. Normally the ratio of ($Hg_2^{2+}$) to ($Hg^{2+}$) is 120 to 1 in aqueous media, but in the presence of complexing agents the equilibrium is shifted to form more ($Hg^{2+}$) (see J. Heyrovsky and J. Kuta, *Principles of Polarography*, Academic Press, New York, New York, p. 171, 1966). Unsaturated compounds such as olefins, and aromatics behave as complexing agents toward ($Hg^{2+}$) and form organomercuricals as products.

Organomercurials are prepared by the method of the invention using a two compartment cell with anode (a Mercury pool) and cathode (any suitably conducting material such as carbon, Hg, Fe, Pb, Al, Sn, Zn, Ni, Pt, etc.). Electrochemical equipment such as commonly used in controlled potential electrolyses may be employed but a constant current power supply (DC current) may be used as well. The separator between compartments may consist of a fritted glass disk, a suitable ion-exchange membrane, or any other material which allows passage of current but does not permit mixing of the contents of the two compartments. The electrolysis is usually conducted at 15°–35° C. but may also be carried out at more extreme ranges of temperature (−30° to 150° C.) depending on the reactivity of the unsaturated substrate.

Pressure is atmospheric but may be elevated where it is desired to use gaseous reactants. The current used is not critical. For practical purposes, a voltage of up to 100 volts and a current up to 2,000 amps. may be used, but there is no critical limit for the products produced.

The unsaturated organic reactant is dissolved in a conducting solution composed of a solvent such as water, methanol, acetic acid, acetonitrile, dimethylformamide, sulfur dioxide, propylene carbonate, etc., or mixtures thereof, and a suitable electrolyte such as $NaNO_3$, $NH_4NO_3$, $H_2SO_4$, $CF_3CO_2H$, $K_2SO_4$, $LiClO_4$, $NaBF_4$, $KPF_6$, $(CH_3)_4NNO_3$, $(nBu)_4NClO_4$, etc. The unsaturated compound which could be olefinic, aromatic, allenic, acetylenic, cyclopropyl, etc., may be introduced into the anode compartment either during the electrolysis or afterwards. A reactant which undergoes electro-oxidation more readily than the mercury anode should preferably be added after mercury salt has been formed. After the reaction has proceeded to the point desired, as determined by a suitable test for inorganic ($Hg^{2+}$), the organomercurial may be isolated in the usual manner if this is the desired product. Typical embodiments are described below (Equations A, B and C).

$$2Hg \longrightarrow Hg_2^{2+} + 2e$$
$$Hg_2^{2+} \rightleftharpoons Hg^{2+} + Hg \quad (A)$$

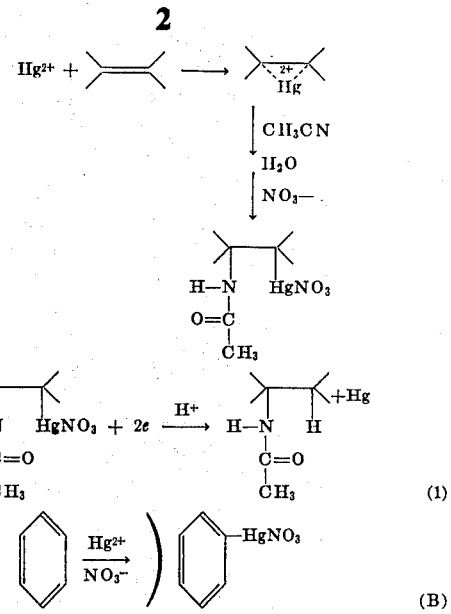

(B)

In a further application of the process, the polarity of the cell is reversed to make the mercury electrode cathodic, or alternatively the contents of the anode compartment are drained into the cathode space of a second cell and an electrochemical reduction carried out on the organomercurial. Reduction takes place in the presence of an electrophilic agent, such as a protic compound (Eq. 1) a ketone or carbon dioxide. The product of reduction may be a bis-mercurial. In protic media an alcohol, an ether, an ester, an amine, or amide, etc., is formed. Such an electrolysis with the mercuration products of cyclohexene (2) are described in (Eq. 2). Any protic source is suitable, such as acids, alcohols or water. But preferred are lower molecular weight compounds such as lower alkanols, low molecular weight carboxylic acids, or water. Examples are methanol, ethanol, propanol, acetic acid, propionic acid, butyric acid, etc.

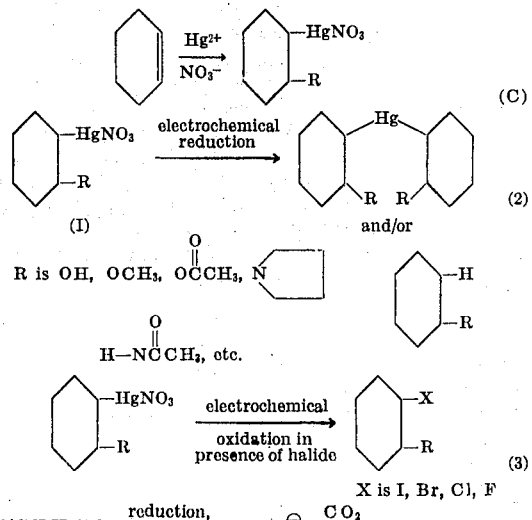

Mercurials may be replaced by halogen on chemical treatment with a halogen, or by reaction of the mercurial and a halogen generated electrochemically (Eq. 3). In aprotic solvents, such as acetonitrile or dimethylformamide, etc., mercurials can be reduced to carbanionic species which may react with the solvent or with a suitable added reactant such as acetone or carbon dioxide to give alcohols or carboxylic acids (Eq. 4) as products, respectively.

The following examples serve to illustrate the methods involved in the formation and use of electrochemically generated organomercurials.

EXAMPLE I

Electrochemical Hydroxymercuration of Cyclohexene

A frit separated cell was used with a carbon cathode, Hg pool anode, and saturated calomel reference. Sodium acetate (1M) in water containing 10 percent of acetic acid, was used as the anode electrolyte to which 4 ml. (0.05 moles) of cyclohexene was added.

Controlled potential electrolysis (25° C., $N_2$ atmosphere, magnetically stirred) was conducted at +0.8 V. vs. SCE until $6.67 \times 10^-$ faradays had been passed. A sticky solid precipitated during the reaction, was filtered off and gave a black deposit on treatment with 10 percent aqueous sodium hydroxide solution indicating mercury and mercurous salts. This was filtered, the filtrate treated with a little sodium chloride solution, and $CO_2$ gas was bubbled through the solution. The precipitate of colorless solid 0.9 g., m.p. 150°–4° C., was crystallized once from acetone (10 ml.), m.p. 153°–153.6° C.

Anal. Calcd. for $C_6H_{11}HgClO$ C, 21.1; H, 3.27; Cl, 10.6.
Found:     C, 21.45; H, 3.26; Cl, 9.15.

EXAMPLE II

Electrochemical Methoxymercuration of Cyclohexene

Using the same apparatus described above, a solution of 10 ml. (0.1 mole) of cyclohexene in 100 ml. of 0.5M $NH_4NO_3$ in methanol containing a few drops of concentrated $HNO_3$ was electrolyzed at +0.9 v. vs. SCE until $3.90 \times 10^{-2}$ faradays had been passed. The contents of the anode compartment were filtered through celite to remove mercurous salt into 500 ml. of 2 percent aqueous sodium chloride solution. The colorless precipitate was filtered and dried in air to give 4.2 g. of product, m.p. 114°–116° C. This was crystallized from chloroform-petroleum ether to give pure trans-1-methoxy-2-chloro-mercuricyclohexane, m.p. 114°–116° C.

Anal. calcd. for $C_7H_{13}HgC1O$: C, 24.0; H, 3.72; Cl, 10.0.
Found:     C, 24.08; H, 3.75; Cl, 9.40.

EXAMPLE III

Electrochemical Acetamidomercuration of Cyclohexene

Using the same procedure as above, but with a Ag, $Ag^+$ (0.01N) reference electrode, a solution of 5 ml. (0.05 mole) of cyclohexene in 100 m. of 0.5M $LiClO_4$ in $CH_3CH$ containing 1 ml. of concentrated $HNO_3$ was electrolyzed at +1.20 v. vs. Ag, $Ag^+$ until $3.38 \times 10^{-2}$ faradays had been passed. During the electrolysis 4 ml. of concentrated $HNO_3$ was added to the anode compartment dropwise. The contents of the anode compartment were poured into 200 ml. of 2 percent aqueous sodium chloride solution, the mixture is extracted with chloroform, the organic extract dried over anhydrous $MgSO_4$, filtered, and the filtrate concentrated leaving 3.5 g. of crude mercural, m.p. 193°–200° C. The IR spectrum was identical to that prepared according to the literature. The solid was crystallized from chloroform-petroleum ether to give pure trans-1-acetamido-2-chloromercuricyclohexane, m.p. 198°–200° C.

Anal. calcd. for $C_8H_{14}NHgC1O$: C, 25.5; H, 3.72; N, 3.72.
Found:     C, 25.07; H, 3.57; N, 3.83.

EXAMPLE IV

Preparation of N-Acetylcyclohexylamine

A solution of 0.1M potassium hydroxide in 1:1 water, alcohol was placed into a two-compartment cell with platinum anode and mercury pool cathode. The cathode compartment was charged with 3 g. of 2-chloromercuri-N-acetylcyclohexylamine. Electroreduction was conducted at 15° C. with a constant current power supply at 0.20 amp. with a cathode potential of 2.8–3.0 v. vs. SCE. After 4 hours the aqueous solution was decanted, neutralized with dilute aqueous hydrochloric acid, extracted with chloroform. The organic extract dried over anhydrous magnesium sulfate, filtered, and the filtrate concentrated in vacuo, leaving 0.8 g. of solid, m.p. 100°–102° C., identified as N-acetylcyclohexylamine. Recrystallization from water-alcohol gave m.p. 102°–103° C.

Anal. calcd. for $C_8H_{15}NO$; C, 68.1; H, 10.6; N, 10.0.
Found: C, 68.1; H, 10.9; N, 10.0.

EXAMPLE V

Preparation of Bis-Mercurial

Electrochemical reduction of 2-chloromercuri-N-acetylcyclohexylamine (4.0 g.) at a mercury pool cathode and platinum anode in 100 ml. of 0.14M $(nBu)_4NClO_4$ in purified acetone under controlled potential conditions (−1.80 v. vs. SCE) gave a 1.5 g. of colorless solid. The solid which had precipitated during the reaction was filtered off and crystallized from methanol, m.p. 260°–263° C.

Anal. calcd. for $C_{16}H_{28}HgN_2O_2$: C, 39.9; H, 5.87; N, 5.7.
Found:     C, 40.1; H, 5.95; N, 5.9.

EXAMPLE VI

Synthesis of $\alpha,\alpha$-Dimethylbenzylcarbinol

Using the constant current system and the usual cell, a solution of 3.8 g. of dibenzylmercury in 100 ml. of 0.5M lithium perchlorate in purified tetrahydrofuran, and 5 ml. of reagent grade acetone was electrolyzed at a mercury pool cathode. After 16 hours at 30 ma., the electrolysis product was isolated in the usual manner leaving 0.6 g. of a colorless viscous oil. Gas chromatographic analysis indicated the presence of about 30 percent of $\alpha,\alpha$-dimethylbenzylcarbinol.

It will be apparent that the present process may be conducted in a number of ways. For example, the entire process could take place in a single reactor using a liquid mercury pool as an anode. The mercuration products could be decanted. If it is desired to convert these products further, the nucleophile could be present during the initial mercuration reaction or added later. In either case, the mercury is made a cathode by current reversal and the nucleophile reacts with the mercurated product at the cathode, and the mercury returns to mercury pool.

An alternative is to decant the mercurated products to a second electrolytic cell where reaction with a nucleophile takes place at a cathode. The cathode may be any previously mentioned. If a mercury cathode is used, the mercury from the organomercurial is readily recovered.

The process could be made continuous by the use of two cells, both employing mercury electrodes, and continuously passing the required reactants into each cell.

I claim:

1. An electrochemical method for preparing an organomercurial derivative of an unsaturated organic compound in an electrochemical cell having an anode and cathode wherein said anode is mercury, which comprises passing a direct current through a conducting solution of said unsaturated organic compound in said cell whereby said anode is converted to mercurous and mercuric ions which react with said unsaturated organic compound to form said unsaturated mercurial derivative.

2. The method of claim 1 wherein said organomercurial is further electrolyzed at a cathode in the presence of an electrophilic reagent.

3. The method of claim 1 wherein said organic compound is dissolved in an electrolyte.

4. The method of claim 1 wherein the temperature of reaction is from about −30° to 150° C.

5. The method of claim 1 wherein the temperature of reaction is from about 15° to 35° C.

6. The method of claim 1 wherein said organic compound is a cycloalkylene compound.

7. The method of claim 1 wherein said organic compound is an aromatic compound.

8. The method of claim 2 wherein said cathode is mercury.

9. The method of claim 8 wherein said reactions are at a common mercury electrode which is made anodic and cathodic by reversal of electric current.

10. The method of claim 2 wherein said organic compound is a cycloalkylene compound.

11. The method of claim 2 wherein said electrophilic reagent is a protic compound.

12. The method of claim 11 wherein the protic compound is water.

13. The method of claim 2 wherein said electrophilic reagent is a ketone.

14. The method of claim 2 wherein said electrophilic reagent is carbon dioxide.

* * * * *